United States Patent [19]

Rambo et al.

[11] Patent Number: 5,779,190
[45] Date of Patent: Jul. 14, 1998

[54] PORTABLE UNMANNED AERIAL VEHICLE

[75] Inventors: James E. Rambo; Jerry H. Bowling, both of Huntsville; Robert S. Kincade, Madison, all of Ala.

[73] Assignee: Northrop Grumman Corporation, Los Angeles, Calif.

[21] Appl. No.: 561,929

[22] Filed: Nov. 22, 1995

[51] Int. Cl.$^6$ .................... B64C 1/16; B64C 1/26
[52] U.S. Cl. .................... 244/54; 244/190; 244/120; 244/124; 244/118.2; 244/131; 244/139; 248/555
[58] Field of Search .................... 244/13, 225, 91, 244/120, 124, 118.2, 131, 132, 139, 147, 54, 65, 190; 248/554, 555

[56] References Cited

U.S. PATENT DOCUMENTS

| | | | |
|---|---|---|---|
| 1,556,502 | 10/1925 | Doucett | 244/139 |
| 2,087,204 | 7/1937 | Johnson | 244/132 X |
| 2,649,265 | 8/1953 | Grant | 244/91 |
| 2,685,422 | 8/1954 | Hammond et al. | 244/225 |
| 3,438,597 | 4/1969 | Kasper | 244/91 X |
| 3,499,623 | 3/1970 | Markham et al. | 244/139 |
| 3,640,491 | 2/1972 | Harrison | 244/131 X |
| 3,640,492 | 2/1972 | Star | 244/131 X |
| 3,935,664 | 2/1976 | Neuhierl | 244/131 X |
| 4,108,401 | 8/1978 | Sullivan | 244/54 |
| 4,659,041 | 4/1987 | Dellinger et al. | 244/139 |

OTHER PUBLICATIONS

MI–TEX & Frazer–Nash Defense Systems, "Unmanned Aerial Vehicle Launching", *Industry Insight*, Fall 1992, p. 27.
By The Staff of Engineered Systems (ESCO)—A Datron Division, "State–Of–The–Art Rail Launchers For Unmanned Aerial Vehicles", *Industry Update*, Fall 1992, pp. 35–37.

Stanley W. Kandebo, "Cypher Moves Toward Autonomous Flight", *Aviation Week & Space Technology*, A McGraw–Hill Publication, Mar. 7, 1994.

CL–227 Sentinel, Baseline HMMWV–Trailer Configuration.

Bell Eagle Eye TiltRotor UAV, Bell Helicopter Textron.

Twinwing—The Joint Tactical UAV Maneuver Solution, Alliant Tech Systems.

Pioneer America's Deployed UAV System, Pioneer UAV, Inc., 1995.

AV Pointer—Airborne Environmental Survey System, AeroVironment Inc., 1995.

Scorpion Freewing Tilt–Body™ UAV, Freewing Aerial Robotics Corporation, Feb. 1995.

Remotely Piloted Vehicle Launcher, Frazer–Nash Defence Systems Division.

HuntAir Unmanned Aerial Vehicle, Remote Systems & Technologies, Westinghouse Electric Corporation.

"Joint Tactical Unmanned Aerial Vehicle (JT–UAV) Maneuver Variant", Raytheon Electronic Systems, Product Data Sheet–Electronic Systems, 95–69 (Jul. 1995).

*Primary Examiner*—William Grant
*Attorney, Agent, or Firm*—Walter G. Sutcliff

[57] ABSTRACT

An unmanned aerial vehicle that includes symmetrical wings, tail section and internal compartments. The wings which include the only control surfaces can be attached to either side of the aircraft. An engine and a payload are non-symmetrically attached modules. Assembly and disassembly is performed with quick release pin and plate latches, quarter turn fasteners and guides that prevent improper assembly. The compartments include quick release hatch covers for the various internal craft compartments.

7 Claims, 8 Drawing Sheets

PORTABLE UNMANNED AERIAL VEHICLE

CROSS REFERENCE TO RELATED APPLICATION

This application is related to the application Ser. No. 08/559,056, filed Nov. 16, 1995, entitled Launcher System For An Unmanned Aerial Vehicle, assigned and incorporated by reference herein.

BACKGROUND OF THE INVENTION

1. Field of the Invention

The present invention is directed to an unmanned aerial vehicle that is portable, modular, with interchangeable left and right side symmetrical parts and which is simple in design and, more particularly, to a system in which the vehicle can be rapidly assembled without any special tools.

2. Description of the Related Art

Unmanned aerial vehicles have generally been complex and difficult to assemble. The typical vehicle looks much like a large model airplane and is difficult to maintain and service because the components are non-symmetrical, non-modular and require the typical sophisticated tools of a modern aircraft. What is needed is an unmanned aerial vehicle that is easy to maintain and easy to assemble.

SUMMARY OF THE INVENTION

It is an object of the present invention to provide an unmanned aerial vehicle that is easy to assemble using simple tools and tool-less assembly methods.

It is another object of the present invention to provide an aircraft that is modular and has many interchangeable symmetrical parts.

It is also an object of the present invention to provide a vehicle that is low in cost and easy to manufacture.

It is a further object of the present invention to provide a single vehicle that can perform multiple missions.

It is an additional object of the present invention to provide a craft that is light in weight and which can be assembled by a two man crew.

It is an object of the present invention to provide an aircraft that is stable at a wide range of operational speeds.

It is another object of the present invention to provide an unmanned aerial vehicle that has a large field of view or regard for sensor payloads.

It is still another object of the present invention to provide an aircraft that is capable of pin point landing with minimal operator skill.

It is also an object of the present invention to provide a vehicle that does not need wheels or wheel retraction mechanisms during take off and landing.

The above objects can be attained by an unmanned aerial vehicle system that includes symmetrical parts, particularly wings and tail sections, that can be attached to either side of the aircraft. The assembly is performed with quick release latches and quarter turn locking fasteners and assembly guides that prevent improper assembly. The payload and propulsion systems are also modular with quick attach and release features. The fuselage includes quick release hatch covers for the various internal compartments.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The unmanned aerial vehicle (UAV) system of the present invention is a synergistic combination of unique systems designed as a platform for a variety of sensor payloads. The two-man portable vehicle is a stable delta wing design with a pusher engine (rear-mounted) and nose mounted payload section. The rear-engine, forward payload arrangement enables the maximum Field-of-Regard (FOR) with minimum obscuration. Delta geometry provides large wing area (lift capability) with a small vehicle footprint ideal for unmanned applications.

The system of the present invention is based on modularity, interchangeability, and simplicity. The wings are symmetrical and interchangeable, reducing the spare parts count and decreasing manufacturing costs. Operationally, a single spare wing will replace either the left or right wing. This not only reduces spare parts count, but simplifies human interface from the manufacturing operation to field repair and assembly. Internal components of the wing are identical for left and right sides as well, decreasing manufacturing costs. Multiple symmetrical hatch covers provide access to the volume inside the fuselage which houses avionics, batteries, and space for additional systems. Any component in the fuselage may be accessed in less than 30 seconds. Assembly of the entire vehicle takes 10 minutes with two crew members. These features make deployment and operation achievable by a two person crew with minimal training.

Figure 1:
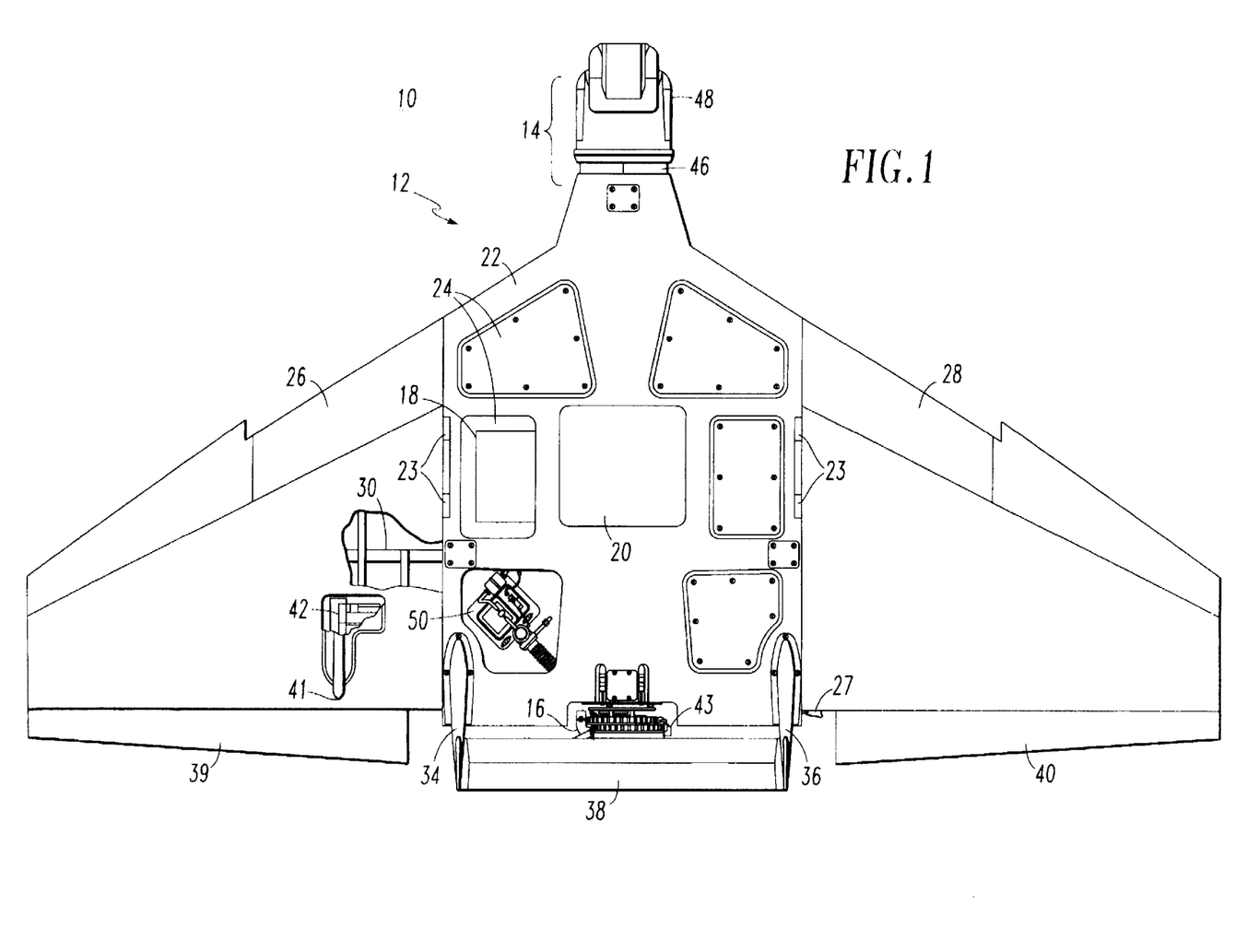
FIG. 1 illustrates a top view of one embodiment of the airframe of the present invention.

The UAV 10 of the present invention, as illustrated in FIG. 1, includes five major subsystems: a delta air frame subsystem 12 which carries the system in the air; a payload subsystem 14 that carries a removable payload; a propulsion subsystem 16 that pushes the craft through the air; an avionics system 18 that handles control of the flight of the UAV 10 as well as data links to the payload; and a recovery system 20 that includes a parachute that brings the UAV safely to ground.

The airframe subsystem 12 is constructed as an airfoil to help provide lift and is made from fiberglass and KEVLAR with carbon fiber reinforcements at high stress points, such as root rib areas and landing skid mounting points. The airframe subsystem 12, as illustrated in FIG. 1, includes a fuselage 22 that has symmetrically shaped compartments 24, to be discussed in more detail with respect to FIG. 9 and which are covered or closed with hatch covers that are attached and removed with conventional quarter turn fasteners that can be operated with a tool as simple as a coin. The symmetrical shape of the hatches allows a hatch from the left side to fit the right side reducing the need for spare parts.

Figure 2:
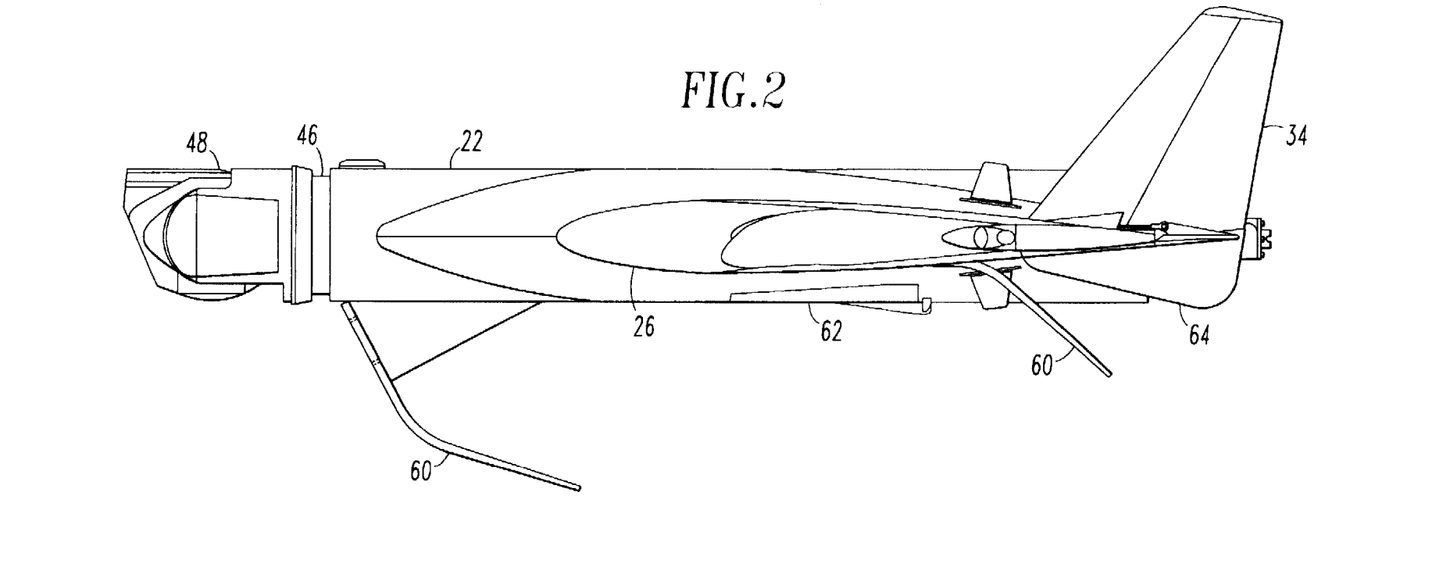
FIG. 2 is a side view.

A pair of wings 26 and 28 are attached to the fuselage 22 creating a wing span of about 13 feet. The wings 26 and 28 are symmetrical in cross section which allows a wing to be mounted on either side of the fuselage 22. The wings are preferably made of fiberglass with KEVLAR or metal reinforcements where needed. A pair of tubular wing spars or supports 30 (with only one side shown exposed) made of metal, or preferably carbon fiber, are removably inserted into the fuselage 22 and over which the wings 26 and 28 fit. The wings 26 and 28 are attached to the fuselage 22 by a quick release latch system that will be discussed in more detail with respect to FIG. 9. The symmetrical shape of the wings 26 and 28 requires that the craft fly at an angle of attack of approximately 4 degrees. The craft also includes a symmetrical tail section 33 (see FIGS. 2–4) that includes a pair of symmetrical vertical stabilizers (tails) 34 and 36 and a horizontal stabilizer 38. The pair of vertical stabilizers 34.36 and the horizontal stabilizer 38 are connected together as a unit and can be attached to the wings 26 and 28 by the quarter turn fasteners (see FIG. 5). An alternate and preferred embodiment, to be discussed in more detail with respect to FIG. 9, attaches the tail section 33 to the fuselage 22 rather than the wings allowing the wings to be removed without removing the tail section 33. The vertical stabilizer 34.36 and horizontal stabilizer 38 do not have control surfaces and the craft control surfaces are elevons 39 and 40 mounted on the rear edge of the wings 26 and 28. The position of the elevons 39 and 40 is controlled by conventional servos 42 that are coupled to the elevons by control rods 41. The control signals are provided through conventional quick release electrical cables.

The propulsion subsystem 16 (FIG. 1) includes an air cooled rotary (WANKEL) aviation fuel engine 43, that includes an alternator, turning a pusher propeller 44. The alternator, through conventional rectifier circuits, keeps an on board battery charged which supplies electricity to the avionics, the payload and the control actuators. The engine 43 is attached to the fuselage 22 by three quick release latches as will be discussed in more detail with respect to FIG. 7. A carburetor assembly 50 for the engine 43 is mounted in the fuselage 22 and held in place with three quarter turn fasteners. Fuel and pressure pulse connections are via quick connects. The carburetor assembly 50 is coupled to the engine 43 by a flexible hose. Electrical controls attach at a standard connector. This construction allows the modular carburetor to be removed and replaced rapidly. A quick connect oil line is also provided to supply oil to the engine. As an alternative a carburetor, with an air filter attached, can be mounted on the engine and a quick connect fuel line provided.

The payload subsystem includes a payload pod 46 and a payload 48. The payload can range from simple camera surveillance systems to complex tracking systems and targeting systems. The payload pod 46 is also attached to the fuselage 22 by the quick release latch system which will be discussed in more detail with respect to FIG. 7. The cables for the payload connect by conventional hand operated cable quick connects. With interchangeable and different mission payloads, a single airframe can execute a variety of missions.

As illustrated in FIGS. 1–5, because the payload 48 is mounted on the extended pod 46 the field of regard or angle at which the payload can view around the UAV 10 is approximately 296 degrees. The UAV 10 also includes fiberglass landing skids 60 which are mounted in a triangular arrangement on the fuselage 22. A parachute compartment 62 (see FIG. 4) of the recovery system 20 is on the lower side of the craft 10. The parachute releases toward the bottom rear of the craft, swings under and behind the craft and is attached to the top of the fuselage 22 at four points 23 along the outer edge. The parachute risers (not shown) extend around the rear of the craft on the outward side of lower stabilizer extensions 64 and the stabilizers 34 and 36, and from the compartment 62 to the top of the fuselage 22. As the parachute deploys the extensions 64 and the vertical stabilizers 34 and 36 keep the risers from being cut or being entangled by the propeller 44 and keep the risers outside the landing skids 60.

Figure 3:
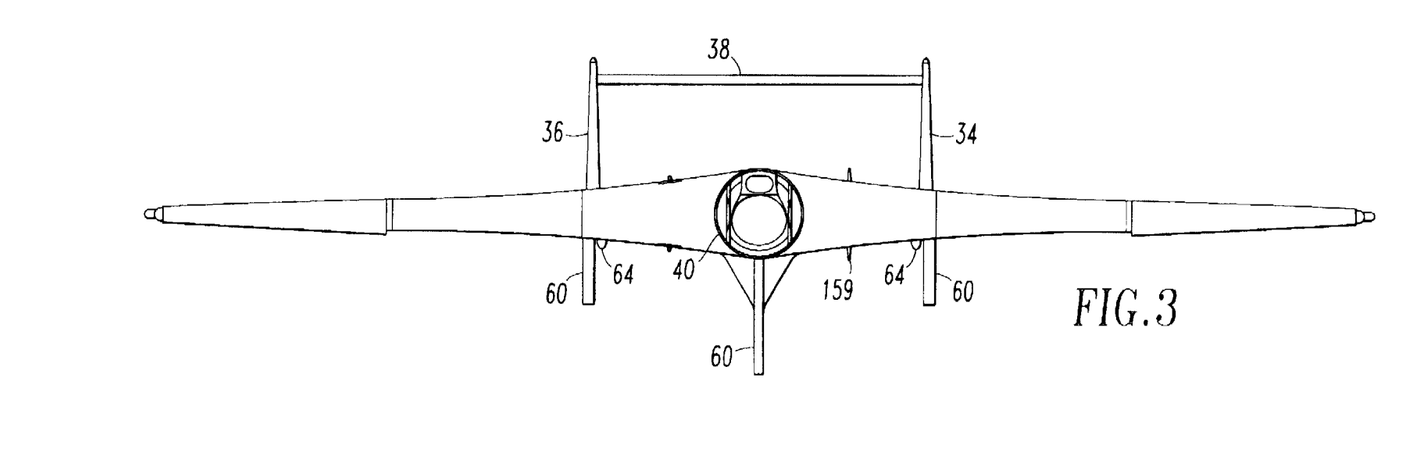
FIG. 3 is a front view.
Figure 4:
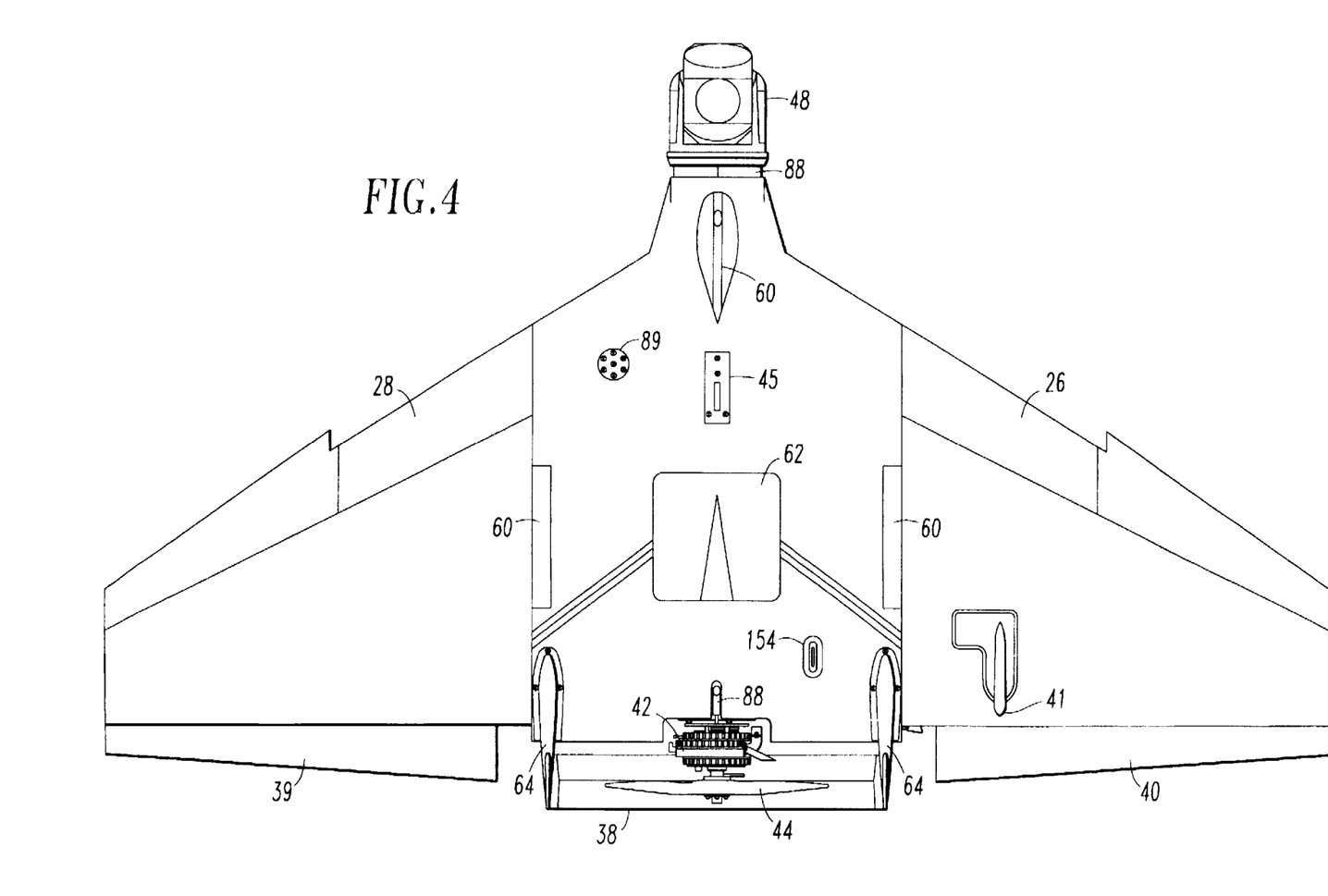
FIG. 4 is a bottom view.

FIGS. 3 and 4 depict front and bottom views of the craft 10 with FIG. 3 particularly illustrating the extensions 64 of the vertical stabilizers 34 and 36 that help to guide the risers as the parachute is deployed. The deployment process occurs while the engine is running and the vehicle 10 is flying. Once the parachute is fully deployed the craft 10 slows to a speed of 12–30 knots. The UAV 10 remains fully maneuverable using only the original flight controls. The canopy has no control actuators. With the canopy deployed, the UAV 10 has increased on station time, but the primary function of the parachute is gentle, pinpoint landing. At the slow speed of the deployed parachute the craft 10 is extremely stable with a stall speed of about 10 knots. The slow speed and full maneuverability, including the ability to climb, enables precise positioning of the vehicle 10 for landing with minimal operator landing skill required. The landing skids 60 of fiberglass or carbon fiber are provided in place of wheels to reduce drag, reduce moving part count and provide for a rugged landing system. FIG. 4 also depicts the launch plate 45 into which the launch blade of the launch system fits.

Figure 5:
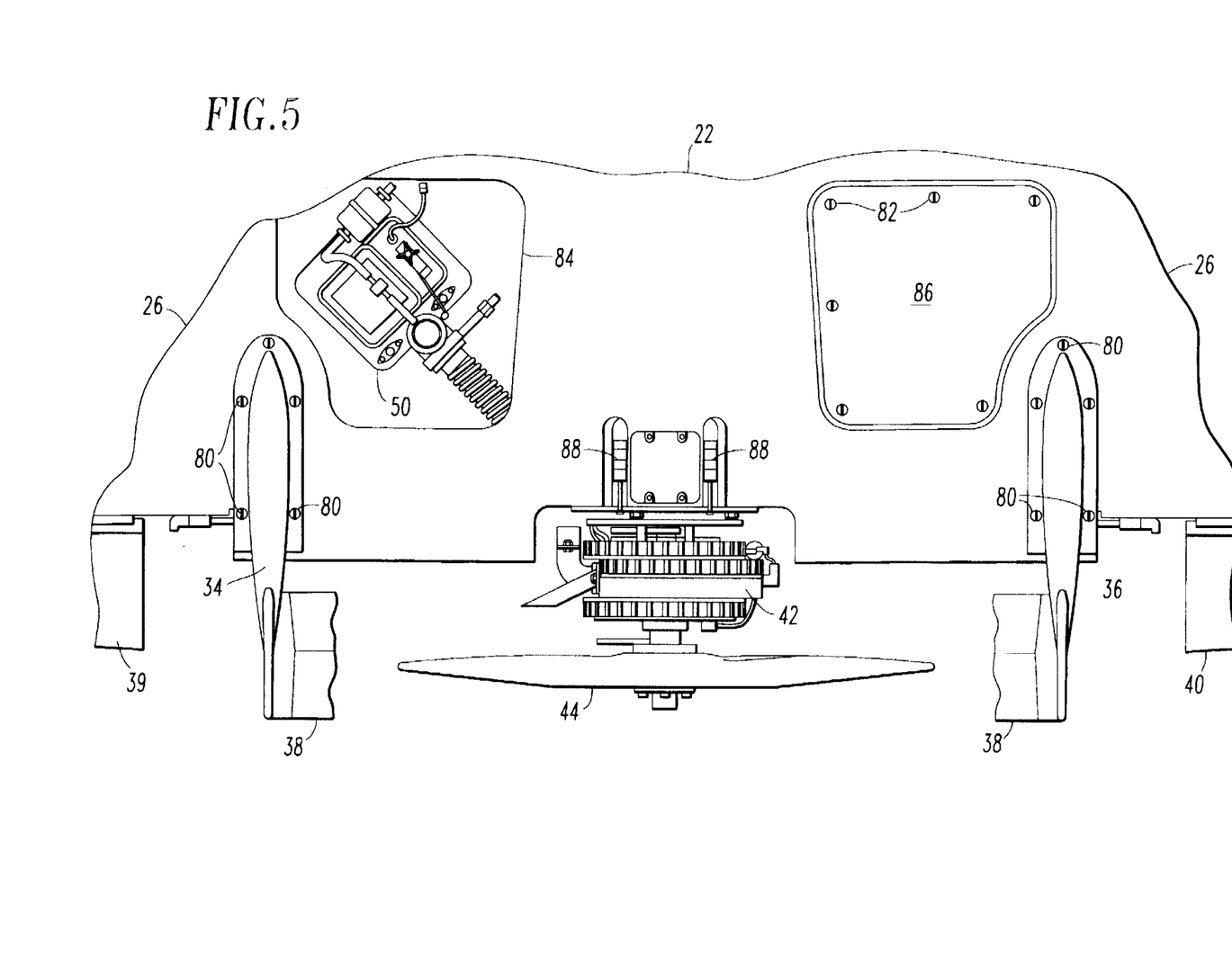
FIGS. 5 and 6 illustrate the engine area of the craft in more detail.
Figure 6:
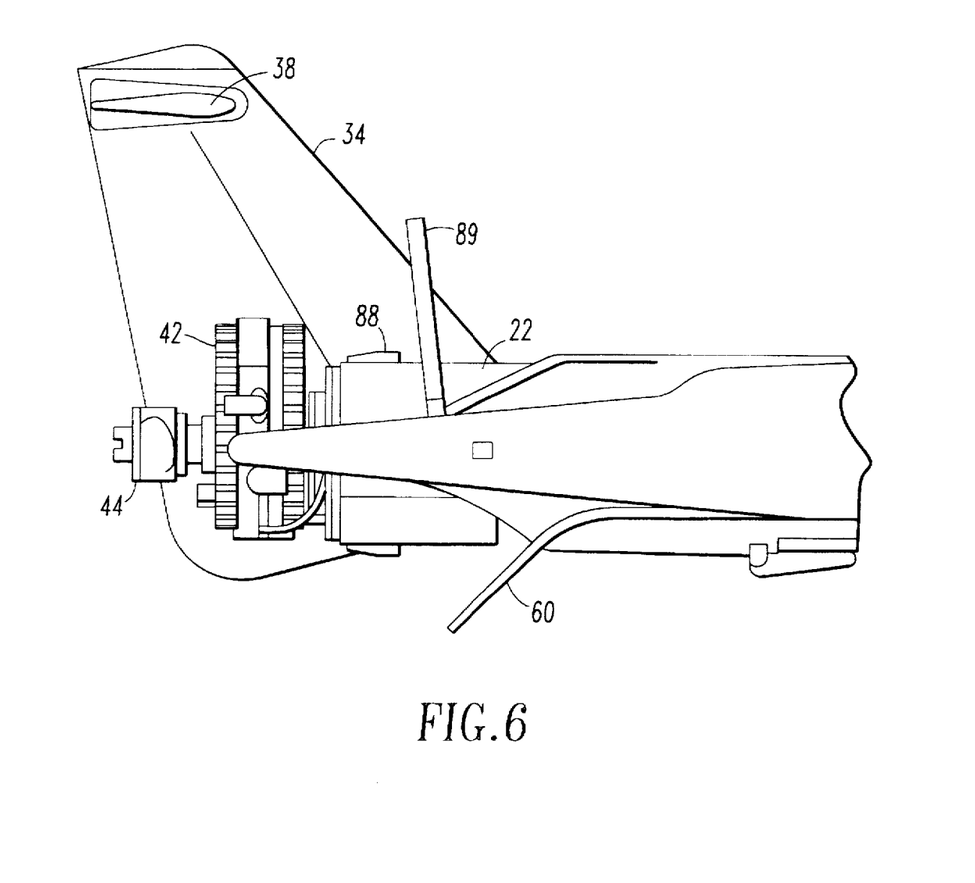

The relationship of the rotary engine 42 to the rear of the craft illustrating how the propeller 44 spins within the area defined by the stabilizers 34.36 and 38 is shown in FIGS. 5 and 6. These figures also show examples of the location of the quarter turn fasteners 80 for the vertical stabilizers 34 and 36 and examples of the same type of fasteners 82 for two of the fuselage compartments 84 and 86. Two of the quick connect tension latches 88 of the quick connect system for the engine 42, are also shown. FIG. 6 also depicts one of the antennas 89 of the craft 10.

Figure 7:
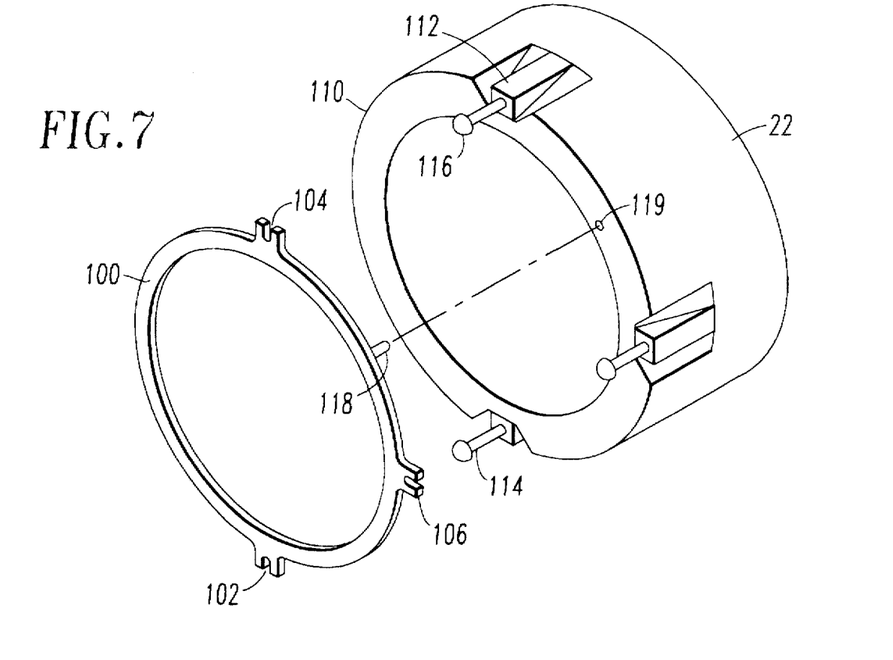
FIG. 7 depicts the quick attach and release mechanism for the engine and payload.

The payload 48 and engine 42 quick release system is illustrated in FIG. 7. The engine 42 (or payload pod 46) is attached to a mounting plate 100 using conventional permanent attachment mechanisms such as bolts. The plate 100 includes non-symmetrically located, notched attachment plates 102,104 and 106. These non-symmetrically located plates 102,104 and 106 prevent the engine or payload from being attached upside down. A corresponding attachment plate 110 is included in the fuselage 22. This plate 110 holds quick release, conventional adjustable draw latches 112,114 and 116 that pull the plates 102,104 and 106 to the fuselage 22. The pins of the latches 112,114 and 116 engage the plates 102,104 and 106 and when the latches are closed the plate 100 (and thus the engine 42 or payload 46) is held tightly to the plate 110. Release of the plates 100 and 110 from each other requires the unlatching of the latches 112,114 and 116 and sliding the pins out of the plates 102,104 and 106. The plate 100 also includes a guide pin 118 extending from the plate 100 toward the plate 110 and which engages a guide hole 119 of plate 110 further ensuring that the plates 100 and 110 are properly aligned. The guide pins carry the major structural loads between the attached components.

Figure 8:
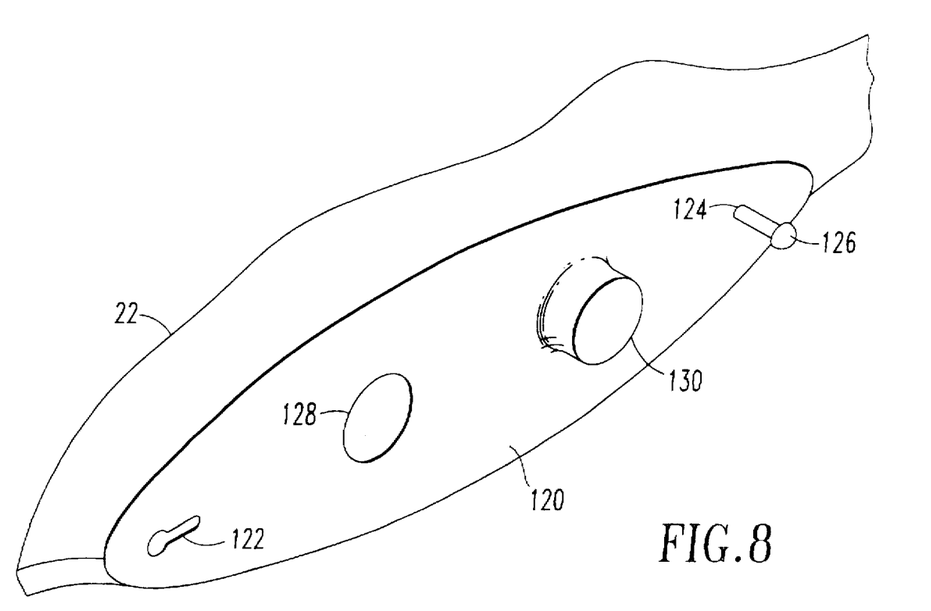
FIG. 8 illustrates wing attachment.

The same sort of quick latch mechanism is used in the attachment of the wings 26 and 28 to the fuselage 22 as illustrated in FIG. 8. The side of the fuselage 22 includes a fiberglass mounting plate 120 integral with the fuselage 22. At the trailing edge of the plate 120, a key shaped metal strike plate 122 is provided and engages a latch pin of a latch 27 mounted on the wing (see FIG. 1). At the leading edge of the plate 120 a latch pin hole 124 is provided through which a pin 126 of a latch mounted on the inside of the fuselage extends. The pin 126 engages a strike plate in the wing (not shown). This latch is reached for operation through one of the access panels of the fuselage 22. The spar 30 (see FIG. 1) for the wing is inserted into a spar socket 128 (FIG. 8). To ensure alignment of the wing with the fuselage 22 and to provide torsional support for the wing and take strain off of the latches, a locating stub 130 extends from the side of the plate 120 and mates with a recess or hole in the wing. The latches, spar socket and stub ensure that the wing is mounted and is not misaligned.

Figure 9:
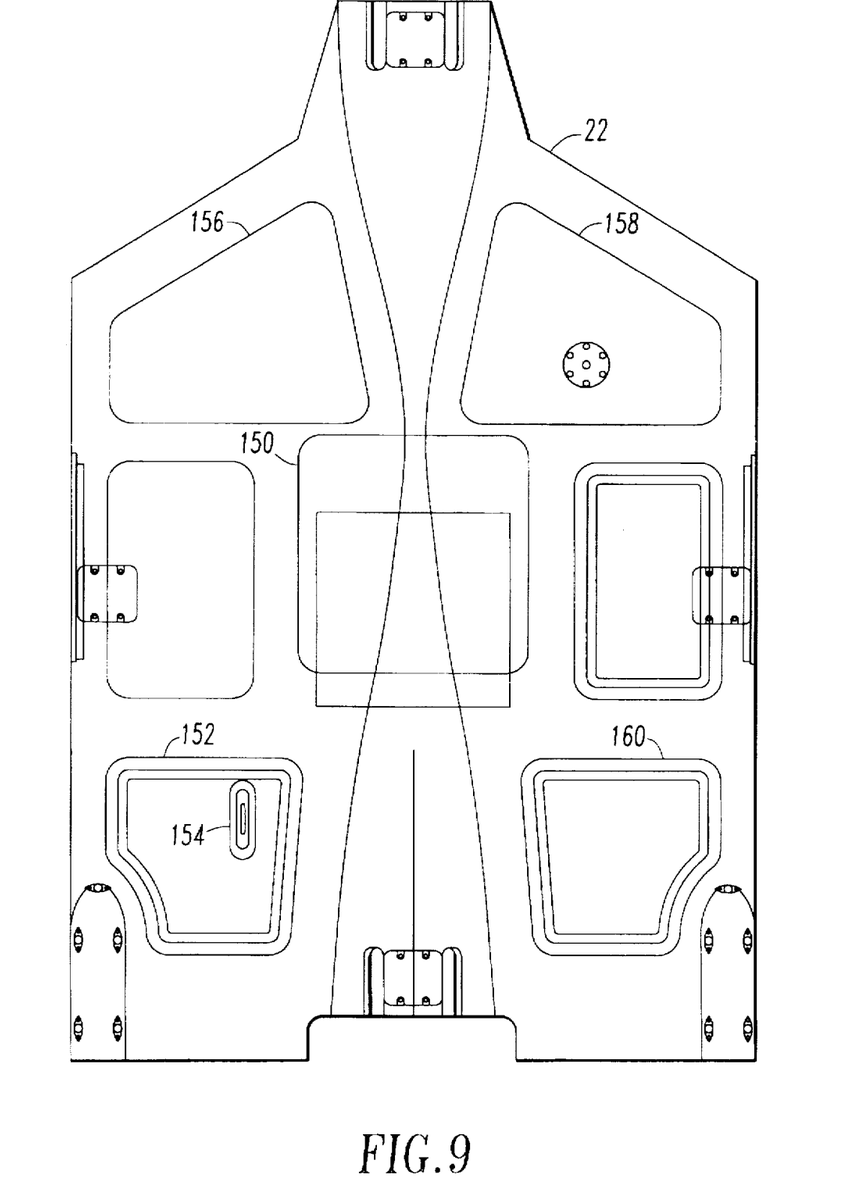
FIG. 9 depicts the fuselage compartments in greater detail.

The arrangement of the compartments accessible from the top side of the fuselage 22 are shown in FIG. 9. The compartments include a fuel compartment 150 provided in the center of the craft to prevent balance problems from occurring during flight as fuel is burned. A flexible fuel bag or bladder is provided in this compartment 150 to reduce problems caused by fuel movement during flight. A carburetor compartment 152 is provided with the carburetor being connected to the engine 42 by a quick connect air hose as previously noted. A blade antenna 154 is provided for communication with the unmanned aerial vehicle radio control electronics (not shown). Compartments 156 and 158 for avionics and batteries are provided. An oil compartment 160 is provided that supplies oil to the fuel as the engine operates. This compartment holds an oil bottle discussed in more detail with respect to FIG. 11.

Figure 10:
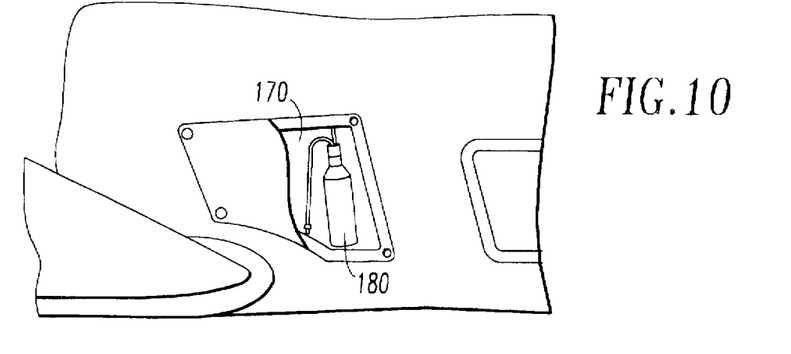
FIG. 10 shows an engine oil bottle and oil compartment.
Figure 11:
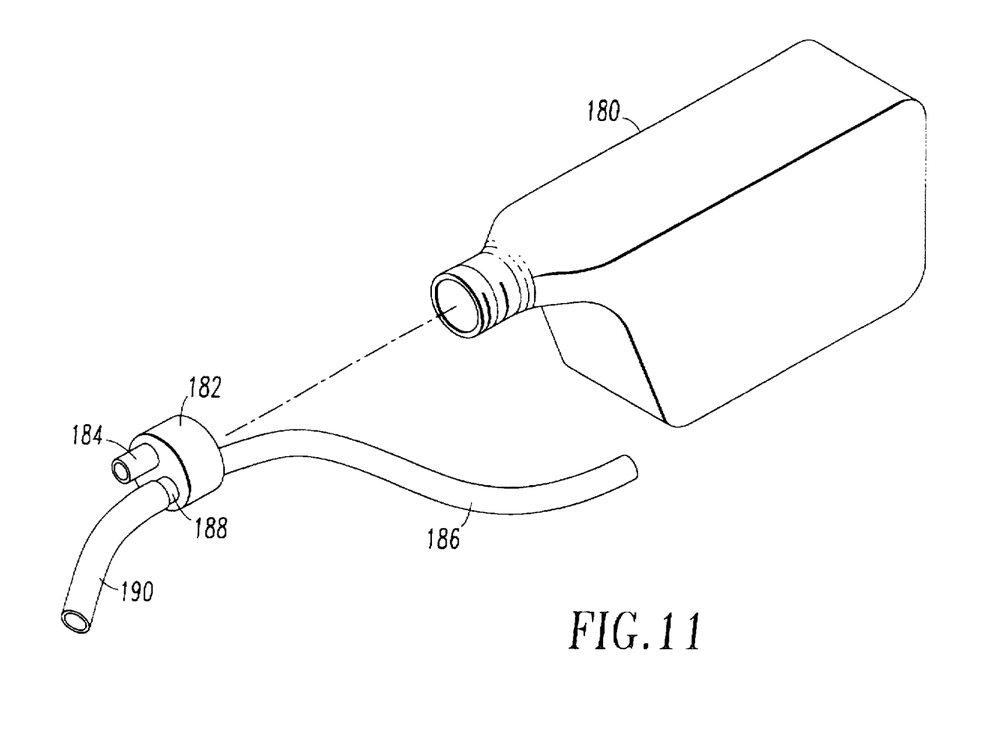
FIG. 11 illustrates the oil bottle of FIG. 10 in more detail.

The oil compartment 160 is divided into two parts, as shown in FIG. 10, with one subcompartment 170 having a width sufficient to hold an oil bottle 180 on its side. The bottle 180, as illustrated in FIG. 11, includes a cap 182 that has a vent hole 184 through which air passes into the bottle as oil is withdrawn. The cap 182 includes a flexible oil pickup tube 186 that lays along the lower side of the bottle 180 and is used to withdraw oil from the bottle. The cap also includes an oil tube nipple 188 over which an intake tube 190 fits. An engine oil pump delivers oil to the fuel for the engine through tube 190. The bottle 180, a standard automotive type container, is reusable, removable and replaces a fixed oil tank.

The vehicle is preferably launched using the launch system described in the related application previously mentioned. The vehicle 10 is flown using conventional radio control electronics (not shown) like those for a model airplane that allow control of engine speed and the aircraft control surfaces as well as parachute release. The avionics also includes conventional devices for sensing fuel level, oil level, battery level and other status that are returned to the operator on the ground over a conventional radio data link.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An unmanned aerial vehicle, comprising:

a pusher engine;

a payload;

a first mounting plate;

one of said engine and said payload being affixed to said first mounting plate;

said first mounting plate having a plurality of non-symmetrically disposed notched attachment plates;

a delta wing airframe having a fuselage and detachable, symmetrical, interchangeable wings;

a second mounting plate affixed to said fuselage;

quick release draw latches for attaching said wings to said fuselage, said engine to said fuselage and said payload to said fuselage;

said second mounting plate including said quick release draw latches for attaching said one of said engine and said payload to said fuselage, wherein each of said draw latches for attaching said one of said engine and said payload to said fuselage includes a pin engageable with a respective one of said non-symmetrically disposed notched attachment plates of said first mounting plate.

2. A vehicle as recited in claim 1, further comprising stabilizers and quarter turn fasteners attaching the stabilizers to said fuselage.

3. A vehicle as recited in claim 1, wherein said fuselage includes symmetrically shaped compartments having covers attached by quarter turn fasteners.

4. A vehicle as recited in claim 1, wherein said wings include the only vehicle control surfaces and include control surface control motors.

5. A vehicle as recited in claim 1, further comprising a wing spar for each wing, said fuselage having right and left sides, each said side including a respective spar socket for receiving a said wing spar, each said side also including a respective locating stubs, with each of said wings including a locating recess which matches said stub when said wing is fastened to said fuselage.

6. A vehicle as recited in claim 1, further comprising an oil compartment and an oil bottle for said compartment and having a cap with an air vent, an oil pickup tube and an engine intake nipple.

7. A vehicle as recited in claim 1, further comprising:

vertical stabilizers attached to said fuselage and having lower extensions extending from a bottom of said fuselage;

a parachute compartment on the bottom of the fuselage; and a parachute attached to a top of said fuselage by cords running around a rear of the vehicle and around an outside of said stabilizers to said parachute compartment.

\* \* \* \* \*